Figures 1, 2, 3:
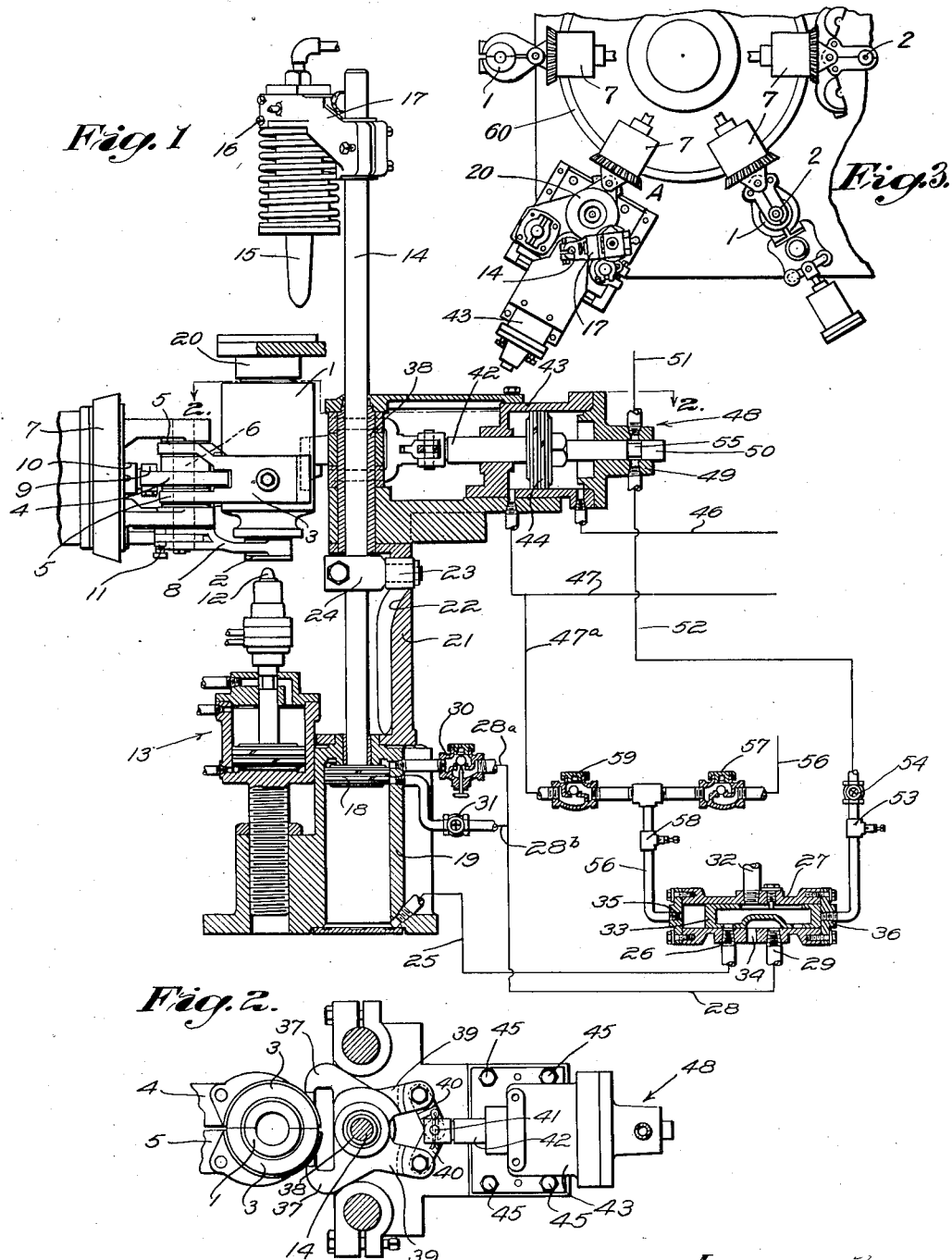

March 26, 1935.  G. E. ROWE  1,995,653
SAFETY DEVICE FOR GLASSWARE FORMING MACHINES
Filed Aug. 22, 1933

Witness:
W. B. Thayer

Inventor:
George E. Rowe
by Brown & Parham
Attorneys

Patented Mar. 26, 1935

1,995,653

UNITED STATES PATENT OFFICE 1,995,653

SAFETY DEVICE FOR GLASSWARE FORMING MACHINES

George E. Rowe, Wethersfield, Conn., assignor to Hartford-Empire Company, a corporation of Connecticut Application August 22, 1933, Serial No. 686,192

5 Claims. (Cl. 49—38)

This invention relates generally to improvements in machines for forming charges of molten glass into articles of glassware, and more particularly to improvements in glassware forming machines having molds, each comprising a plurality of separable sections, and having means for applying pressure to the glass, or to a portion of the glass in each mold when that mold is disposed in a definite position and is closed.

One type of glass forming machine to which the present invention is applicable has a plurality of blank or parison molds mounted on an intermittently rotated carrier so that each of such molds is presented in its turn at a station at which a charge of molten glass may be delivered thereto. Each of such blank or parison molds ordinarily comprises a parison body mold consisting of a pair of hinged separable halves and a neck mold which likewise consists of a pair of hinged separable halves. Suitable mold supporting and operating mechanism ordinarily is provided for closing each parison mold and for inverting such mold before or when it is brought to its charge receiving station. It is usual for the halves of the parison body mold to overlap the halves of the neck mold so that the closing of the halves of the parison body mold will effect closing of the halves of the neck mold and the neck mold will be clamped shut by the body mold so long as the latter is maintained closed.

The intermittently rotated carrier of a machine of the type just mentioned ordinarily is provided with a locking means by which the carrier is temporarily locked gainst movement after completion of each of its intermittent rotary movements.

A machine of the type just referred to usually includes a pair of pivoted clamping jaws and mechanism for closing them in engagement with the halves of the parison body mold when the latter is at the charge receiving station. All such clamping devices of which the applicant is aware may have a slight bodily movement in a horizontal plane so that the position of the clamping device adjacent to the charge receiving station may be automatically adjusted in accordance with variations in the exact positions of the several parison molds which are brought in turn to that station. The supporting and operating connections between the sections of the parison molds and their carrier ordinarily are sufficiently loose to permit some play between the parts thereof and the exact positions of the several clamped parison molds at the charge receiving station may vary. Such variations between the exact positions at the charge receiving station of different molds of a machine such as now is in common use are not particularly important because the only operations which ordinarily have been performed at that station have been to deliver a mold charge to the waiting mold and thereafter to apply a blow head to the mold for supplying air under pressure thereto to settle or compact the glass in the mold and both of these operations may be performed when the exact positions of the several molds vary within the usual limits. However, any variation of the position of a mold from a predetermined exact position at the station referred to is important and may be attended by adverse consequences when a vertically disposed plunger is thrust downwardly along a given vertical path into the glass in the mold at the charge receiving station for the purpose of forming a cavity in the upper end portion of the glass in the mold and of causing a symmetrical upward displacement of glass in the mold between the plunger and the walls of the adjacent portion of the mold cavity, as disclosed in my application, Serial No. 661,521, filed March 18, 1933, on which Patent No. 1,945,983 was granted on February 6, 1934, and also in the application of Arthur Edgar Smith, Serial No. 635,360, filed September 29, 1932, on which Patent No. 1,945,985 was granted on February 6, 1934, and owned by the assignee of both my aforesaid prior application and the present application. It is also important that the plunger shall not be thrust downwardly into the glass of the mold until the sections of the mold have been clamped securely in their closed positions, as the pressure exerted on the glass in the mold may otherwise force the sections of the mold apart to a greater or less extent and thus interfere with subsequent operations or cause defects in the subsequently produced glassware.

Furthermore, it is important that the plunger referred to shall not be permitted to move from its raised inactive position into the path of any of the elements on the carrier while the carrier is free to move for the reason that some temporary failure of or interference with normal operation of some part of the machine might disrupt the timed relation between the carrier and the plunger and cause a collision between the plunger and a moving part of the machine, with consequent injury to or impairment of one or both of the colliding parts.

An object of the present invention is to provide a safety device for glassware forming apparatus, such as above generally described as being disclosed in my aforesaid application, Serial No. 661,521, and in said Smith application, Serial No. 635,360, said safety device being effective to accurately locate the charged mold into which the glass pressing plunger is to be lowered exactly at the position required to insure symmetrical upward displacement of glass between the downwardly moving plunger and the walls of the adjacent portion of the mold cavity.

A further object of the invention is to provide an improved mechanism for clamping the halves of the mold together at a given station and for controlling the operation of an associate mechanism, such as the plunger above referred to, for applying pressure to glass in the mold so that said pressure applying device will be maintained in an inactive out-of-the-way position until the clamping device has been operated to maintain the mold closed.

A further object of the invention is to provide a safety device of the character described that will be effective to retain the plunger in its inactive out-of-the-way position so long as the mold carrier of the associate glassware forming machine is free to move, even though all other conditions precedent to the movement of the plunger from its inactive position have been satisfied.

Other objects and advantages of the invention will become apparent from the following description when it is considered in conjunction with the accompanying drawing, in which:

Figure 1 is a view partly in side elevation and partly in vertical section, showing a safety device embodying the invention applied to the mechanism for clamping shut the sections of an inverted parison mold in position to permit a plunger to be thrust downwardly into the glass in the mold, the view showing only such parts of the glassware forming apparatus as are believed to be required for an understanding of the invention;

Fig. 2 is a horizontal sectional view substantially along the line 2—2 of Fig. 1, looking in the direction of the arrows; and Fig. 3 is a fragmentary diagrammatic plan view showing structure embodying the improvement features of the present invention in association with a rotary carrier on which parison molds are supported, said carrier being adapted to bring the molds in turn to a charge-receiving station adjacent to which the structure of the present invention is located.

Referring now to the drawing, an inverted parison mold comprises a body mold 1 and a neck mold 2. The body mold comprises separable halves which may be carried by holders 3, as is usual.

The holders for the halves of the parison body mold have arms, such as illustrated at 4 and 5—5, which arms are pivoted on a vertical pivot pin 6. The pivot pin is supported by projecting arms on a head 7. The latter may be a part of a carrier including a horizontal table 60, Fig. 3, that is rotated intermittently about a vertical axis. The head 7 may be rotatable about an axis that extends radially of the rotary table for the purpose of inverting and reverting the mold, as is usual in a machine of the type that has been described so far.

The neck mold 2 may comprise a pair of halves or sections, supported on arms, such as indicated at 8. These arms are pivotally supported on the pivot shaft 6. The arms 4 and 5—5 are connected by suitable pivoted links, such as indicated at 9, Fig. 1, with the outer end of a piston rod 10, whereby the halves of the parison body mold may be opened and closed by reciprocation of the piston rod. The arms for the halves of the neck mold may be provided with suitable mechanism, generally indicated at 11, whereby the neck mold may be opened at the proper time and the halves thereof will be permitted to close as the halves of the parison body mold are closed. The aforesaid rotary table may support a plurality of parison molds, each having its own supporting and operating mechanisms and each being adapted to be brought in its turn to a charge receiving station, such as that indicated at A in Fig. 3.

Beneath the closed mold at the charge receiving station is a neck pin 12 which may be projected upwardly into the neck mold and retracted therefrom at suitable times. Mechanism for supporting and operating the neck pin is designated generally at 13, and need not be described in detail.

A vertical shaft 14 is located exactly in a predetermined position adjacent to the closed mold when the latter is in the position desired. The shaft 14 is vertically movable so that a plunger 15 that is carried by a combined settle blowing and plunger carrying head 16 on an arm 17 attached to the shaft 14 may be raised and lowered to and from position to press a cavity in the glass in the mold and to cause a symmetrical upward displacement of glass between the plunger and the walls of the mold cavity. The shaft 14 is carried by a piston 18 that is reciprocable in a vertical cylinder 19. The shaft 14 also is turned angularly about its axis to move the plunger laterally from an out-of-the-way position to a position directly above and in axial alignment with the mold when the latter is exactly at the position desired and before the lower end of the plunger has moved downwardly into such mold or into a charge guiding funnel 20 on the upper end of the inverted parison mold, and to swing the plunger laterally to the out-of-the-way position when it has been retracted or moved upward to position to clear the mold and the funnel 20 if the latter remains on the mold during the operation of the plunger. The mechanism for causing the angular turning movement of the shaft 14 as it moves vertically may comprise a vertical arcuately curved cam plate 21 having a suitably configured groove or slot 22 in which works a roller 23 on a lateral stud or arm 24 that is attached to or carried by the shaft 14.

The upward movement of the shaft 14 is effected by the application of fluid pressure to the portion of the cylinder 19 beneath the piston 18. A fluid pressure or air line 25 connects a port at the lower end of the cylinder 19 with a port 26 in a valve 27. An air line 28 leads from a port 29 of the valve 27 to the upper portion of the cylinder 19, such air line being illustrated as comprising a branch 28a that communicates through an adjustable check valve 30 with a port at the extreme upper end of the cylinder 19 and a second branch 28b that communicates through an adjustable needle or shut-off valve 31 with a port that is located in a wall of the cylinder 19 adjacent to, but below the level of the upper end of that cylinder. The valve 27 is of the slide valve type and has a pressure fluid or air inlet 32. A reciprocable or sliding valve member 33 is adapted, when at one end of its stroke, to connect the inlet 32 with the port 26 and, when at the other end of its stroke, to connect the inlet 32 with the port 29.

The valve member 33 also is effective to connect either port 26 or 29 with an exhaust port or vent 34 when the other port 26 or 29 is connected with the inlet port 32. The casing of the valve 27 has ports 35 and 36 respectively at opposite ends thereof with which air lines are connected for admitting air under pressure to and exhausting air from the respective ends of the valve casing. Control of the application of pressure fluid to the opposite ends of the valve casing is effected by mechanism embodying features of the present invention and will be presently described.

When the inverted parison mold has been brought by its carrier to a position approximately or close to the position desired, the clamping jaws 37 are closed to engage the sections of the parison body mold. The clamping jaws are pivoted on a sleeve 38 which encircles and is concentric with the shaft 14. The fit of the bearings of the jaws 37 with their pivot sleeve 38 is sufficiently close to prevent any lateral play or relative movement between these parts. Rearwardly extending arms 39 on the jaws 37 are connected pivotally with links 40 which are pivotally connected with a yoke or head 41 on a piston rod 42. The piston rod 42 projects from a horizontal cylinder 43 and is operated by a piston 44 that is reciprocable in the cylinder 43. The cylinder 43 is fixedly attached, as by cap bolts 45 through the base thereof, to a fixed support in a definite predetermined relation to the axis of the pivot sleeve 38 about which the clamping jaws 37 may swing and in a fixed relation to the vertical path of descent of the plunger 15 into the mold therebeneath. Consequently, when the jaws 37 are closed in engagement with the halves of the parison body mold, the closing of such jaws will bias that mold to the exact position desired should the mold be slightly out of that position when engaged by the jaws. This will insure exact alignment of the plunger with the mold cavity when the plunger is thrust downwardly into the glass in the mold.

Air from a line 46 may be admitted to and exhausted from the outer end of the cylinder 43. Air from a line 47 may be admitted to and exhausted from the inner end of the cylinder 43. It is obvious that when air is admitted to the outer end of the cylinder 43, the piston 44 will be forced to the position shown in the drawing and clamping jaws 37 will be closed in engagement with the sections of the parison body mold.

The mechanisms which have been described in detail so far are also disclosed in my copending application, Serial No. 661,521, of which the present application is a continuation in part.

In order that the plunger 15 may be prevented from moving downward into the mold until that mold has been definitely located at the exact position desired, and until the sections of the mold have been clamped closed by the clamping jaws 37, the present invention provides means for preventing flow of air or fluid under pressure to the port 36 of the valve 27 until the jaws 37 have been clamped in engagement with the mold. To this end, the air line for supplying air through the port 36 to the adjacent end of the valve casing 27 includes a valve generally designated at 48, the casing of which may be formed as a tubular extension 49 of the outer head of the cylinder 43. The moving element of this valve 48 comprises a rod 50 which may be formed as an axial outward extension 50' of the rod of the piston 44 and is movable with the latter. Diametrically opposite ports in the valve casing 49 are connected with air lines 51 and 52, the air line 51 leading from a suitable timer (not shown) while the air line 52 connects with the port 36 of the valve 27. The air line 52 preferably has a bleeder valve 53 and an adjustable or shut-off valve 54 included therein. An annular groove 55 is formed on the movable valve rod 50 in such position as to open communication between the air lines 51 and 52 when the piston 44 is at the inner end of its path of reciprocatory movement in the cylinder 43 and the jaws 37 are closed in engagement with the mold. At all other times, the valve rod 50 shuts off communication between the lines 51 and 52.

An air line 56 leads through a check valve 57 and a bleed valve 58 to the port 35. A branch 47a of the air line 47 to the forward end of the cylinder 43 communicates through a check valve 59 with the air line 56 at a place between the check valve 57 and the bleed valve 58.

The lines 46 and 47 are controlled with relation to the operations of the associate glassware shaping machine and particularly with relation to the periods of alternating rotary movements and dwells of the rotary mold carrier thereof, as by connection with the air lines of the locking mechanism for that carrier, so that air will be supplied through the line 47 whenever and so long as the carrier is free to move and to the line 46 when the carrier is locked in place after having completed an intermittent rotary movement.

Air from the line 47 will pass to the left hand end of the cylinder 43 and also through the branch line 47a and a portion of the line 56 to the left hand end of the valve 27 and thus will maintain the valve member 33 at the right hand end of the valve casing so long as the mold carrier is free to move. This is the position shown in Fig. 1 and at this time the plunger 15 is held in its raised inactive and out-of-the-way position.

The air lines 51 and 56 are controlled from a suitable timer, such, for example, as that which controls the operations of the associate feeder (not shown) so that puffs of air will be supplied to these lines at times which have been predetermined with relation to the operations of the feeder, with which the normal operations of the glassware shaping machine are also ordinarily synchronized. In the drawing, the clamping jaws 37 are shown as having closed to locate the parison mold at the exact position desired and to clamp the separable parts of such mold closed at that position. The operation of the mechanism for closing and opening the clamping jaws has opened the valve 48 so that the succeeding puff of air supplied to the line 51 will pass to the right hand end of the casing of the valve 27 and tend to move the valve member 33 to the opposite end of the valve casing. Normally, as when the parts are in the positions shown in Fig. 1 and the mold carrier of the shaping machine is not free to move but is restrained against rotary movement by its locking mechanism, this puff of air will be effective to move the valve member 33 to the left hand end of the valve casing for the reason that air is not then being supplied to the left hand end of said valve casing from the lines 47, 47a and connecting portion of line 56. The movement of valve member 33 to the left hand end of its valve casing will permit air to pass from the air inlet 32 through the valve 27 to the air line 28 and thence to the upper end of the cylinder 19. The consequent downward movement of the piston 18 will cause a downward movement of the plunger 15 into the glass in the mold that has been clamped securely in the exact position desired.

Exhaust from the space in the cylinder 19 beneath the descending piston 18 will take place through the line 25, the port 26 and the exhaust port 34 of the valve 27. At a suitable time interval controlled by a timer, as aforesaid, a puff of air from the line 56 will return the valve member 33 to the position shown in Fig. 1 with a consequent stoppage of air to the upper end of the cylinder 19 and application of air under pressure to the lower end of the cylinder. This will effect raising of the plunger 15.

Also, at a suitable time, the application of air from the line 46 to the outer end of the cylinder 43 will be discontinued and air will pass through the line 47 to the forward end of the cylinder to effect retraction of the piston 44 and opening of the clamping jaws 37. This movement of the piston 44 will also close the valve 48 so that the plunger 15 cannot be lowered until the jaws have again been closed to locate a mold accurately in a position below and in exact alignment with the path of downward movement of the plunger and to clamp the separable sections of that mold securely in closed position.

The function and utility of the plunger 15 are fully explained in my aforesaid prior application, Serial No. 661,521.

If, because of a temporary disruption of the proper timed relationship between the movements of the rotary mold carrier and the aforesaid timer, the rotary mold carrier should be free to move at the time that a puff of air was supplied through the air line 51, valve 48, and air line 52, such puff of air would be ineffective to move the valve member 33 from the position shown in Fig. 1 against the air pressure passing to the opposite end of the valve 27 from the line 47. Consequently, the plunger 15 would remain in its raised inactive position, despite the continued functioning of the timer controlling the line 51 and resumption of operation of the plunger would take place only when the proper timed relationship of the operations of the several cooperating parts had been restored. Otherwise, the lowering of the plunger into the path of movement of parts on the moving mold carrier probably would result in damage to one or more of these parts. Such disruption of timed relationship may occur occasionally in actual service, as by the sticking of the clamping jaws after the locking means for the mold carrier had released it followed by forcible opening of such jaws by an implement in the hands of the machine attendant.

While I have illustrated and described one particular structural embodiment of the invention as applied to a glassware forming machine of a particular type of construction and a particular mode of operation, the invention is not to be limited thereto but is susceptible of embodiment in various forms of construction as indicated by the terms of the appended claims.

I claim:

1. In apparatus for forming glassware, a mold, means for bringing said mold approximately to a definite position and for supporting said mold there for limited horizontal floating movement, a plunger adapted to be projected downward into the mold in accurate alignment with the latter when the mold is exactly at said definite position, and a clamping device comprising a pair of pivoted jaws having a fixed vertical pivotal axis adjacent to said definite position, means for opening and closing said jaws, said last named means including a pressure fluid cylinder having a fixed position so related to the pivotal axis of the clamping jaws and to said definite position that the closing of the jaws to clamp the mold that has been brought approximately to said definite position will accurately locate and maintain said mold exactly at that definite position, and means maintained inactive until said clamping jaws have closed in engagement with the mold to locate the latter exactly at said definite position and then operated automatically to thrust said plunger downward into the mold.

2. In apparatus for forming glassware, a mold comprising a plurality of separable sections, means for closing said sections and for bringing said mold to a charge receiving station, a plunger adapted to be projected downwardly into the glass in the mold when the latter is at said charge receiving station, a pair of pivoted jaws adjacent to said charge receiving station and adapted when closed to clamp said separable sections of said mold shut, means for closing said jaws, and means effective to prevent downward movement of the plunger when said jaws are open and rendered effective automatically when the jaws are closed to lower said plunger into the glass in the mold.

3. In apparatus for forming glassware, a mold comprising a plurality of separable sections, means for bringing said mold approximately to a charge receiving station and for closing the sections of the mold when said mold is brought approximately to said station, a clamping device comprising a pair of pivoted jaws adjacent to said station and adapted when closed to clamp shut the sections of said mold, means for opening and closing said jaws, said last named means including a pressure fluid cylinder, a reciprocable piston in the cylinder connected with said jaws to open and close them as said piston reciprocates in said cylinder, a plunger adapted to be projected downwardly into glass in the mold when the latter is at said station to displace a portion of the glass upwardly between said plunger and the adjacent walls of the mold, means for operating said plunger to project it downwardly into the glass and to withdraw it from the glass in the mold at said station, and means responsive to the movement of said piston in the cylinder of the mechanism for opening and closing said jaws for controlling said plunger operating mechanism to render the latter ineffective to move the plunger downward until said jaws have been closed to clamp together said sections of said mold.

4. In apparatus for forming glassware, a mold comprising a plurality of separable sections, means for closing said sections and for disposing said mold in closed position at a charge receiving station, means for applying pressure to a portion of the glass of a charge in the mold, a clamping device for holding said sections of the mold closed while said pressure is applied to the glass, and means controlled by said clamping device to prevent operation of said device for applying pressure to the glass until said clamping device has been operated to hold the sections of the mold closed.

5. In apparatus for forming glassware, a mold, an intermittently moving carrier for bringing said mold approximately to a definite position at which a charge of glass may be delivered thereto, a clamping device for engaging said mold to locate the mold exactly at said definite position, an air motor operatively connected with said clamping device, an air line connected with the inner end of said air motor for supplying air under pressure thereto when said carrier is free to move and for discontinuing said air when said carrier is at rest with said mold approximately at said definite position, an air line for supplying air under pressure to the outer end of said air motor when said carrier is at rest with said mold approximately at said definite position and for discontinuing the supply of said air to the outer end of said air motor when the carrier is free to move, a plunger adapted to be moved from a raised inactive and out-of-the-way position downwardly into the glass in the mold, when said mold has been located by said clamping means exactly at said definite position and has been charged with glass, pneumatic means for operating said plunger, said pneumatic means including an air motor connected with the plunger for raising and lowering it, a control valve having a reciprocable valve member adapted when at one end of its stroke to connect a source of air pressure supply with one end of said last-named air motor to effect raising of said plunger to its raised inactive position and to maintain it there, said reciprocable valve member being adapted when at the opposite end of its stroke to connect said source of air pressure supply with the opposite end of said second-named air motor to effect lowering of said plunger, an air line for periodically applying puffs of air to one end of said valve, each of said puffs tending to move said reciprocable valve member to said first-named end of its stroke, an air line for periodically applying puffs of air to the opposite end of said valve, each of said last-named puffs tending to move the reciprocable valve member to said opposite end of its stroke, and an air line interconnecting said air line to the inner end of the first-named air motor and said first-named air line for applying puffs to the valve, substantially as and for the purpose described.

GEORGE E. ROWE.